(12) United States Patent
Ishizuka et al.

(10) Patent No.: US 7,534,823 B2
(45) Date of Patent: May 19, 2009

(54) VINYL CHLORIDE RESIN COMPOSITION

(75) Inventors: Hidehiro Ishizuka, Saitama (JP); Yutaka Yonezawa, Saitama (JP)

(73) Assignee: Adeka Corporation, Tokyo (JP)

( * ) Notice: Subject to any disclaimer, the term of this patent is extended or adjusted under 35 U.S.C. 154(b) by 274 days.

(21) Appl. No.: 11/628,365

(22) PCT Filed: Jun. 28, 2005

(86) PCT No.: PCT/JP2005/011790
§ 371 (c)(1), (2), (4) Date: Dec. 4, 2006

(87) PCT Pub. No.: WO2006/006386
PCT Pub. Date: Jan. 19, 2006

(65) Prior Publication Data
US 2008/0045635 A1  Feb. 21, 2008

(30) Foreign Application Priority Data
Jul. 7, 2004  (JP)  ............... 2004-200614

(51) Int. Cl.
C08K 5/16   (2006.01)
C08K 5/22   (2006.01)
C08K 5/3475 (2006.01)
C08F 14/06  (2006.01)

(52) U.S. Cl. .................. 524/91; 526/344

(58) Field of Classification Search ............ 524/91, 524/106
See application file for complete search history.

(56) References Cited
FOREIGN PATENT DOCUMENTS

| JP | 47-41735 | 10/1972 |
|---|---|---|
| JP | 47-39141 | 12/1972 |
| JP | 56-147839 | 11/1981 |
| JP | 58-7704 | 1/1983 |
| JP | 2-258856 | 10/1990 |
| JP | 8-283501 | 10/1996 |
| JP | 08283508 A | * 10/1996 |
| JP | 10-308122 | 11/1998 |

OTHER PUBLICATIONS

Translation of JP 08283508, Oct. 1996.*

* cited by examiner

Primary Examiner—Ling-Siu Choi
Assistant Examiner—Hui Chin
(74) Attorney, Agent, or Firm—Young & Thompson

(57) ABSTRACT

A vinyl chloride resin composition comprising 100 parts by mass of a vinyl chloride resin, (a) 0.001 to 10 parts by mass of at least one benzotriazole compound represented by general formula (I), and (b) 0.001 to 10 parts by mass of at least one salicylamide compound represented by general formula (II):

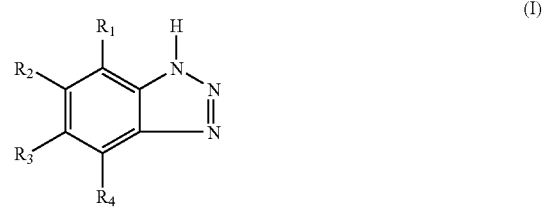

(I)

wherein $R_1$, $R_2$, $R_3$, and $R_4$ each represent a hydrogen atom, a halogen atom, a hydroxyl group, a nitro group, a carboxyl group, an alkyl group, an alkoxycarbonyl group or an alkanoylamino group.

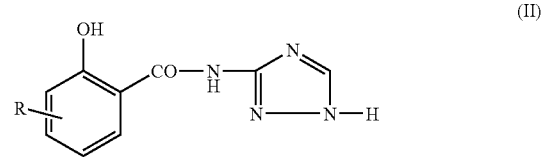

(II)

wherein R represents a hydrogen atom, an alkyl group having 1 to 12 carbon atoms or an alkoxy group having 1 to 12 carbon atoms.

17 Claims, No Drawings

VINYL CHLORIDE RESIN COMPOSITION

TECHNICAL FIELD

This invention relates to a stabilized vinyl chloride resin composition. More particularly, it relates to a vinyl chloride resin composition containing a benzotriazole compound and a salicylamide compound and capable of providing a wire coating compound excellent in coloring resistance, resistance to copper contamination, and the like.

BACKGROUND ART

A vinyl chloride resin is very important as an insulation material because of its excellent properties such as electrical insulating properties, arc resistance, tracking resistance, and dielectric strength compared with rubbers or polyolefins. However, a vinyl chloride resin undergoes reduction in various characteristics due to thermal and oxidative deterioration and becomes unable to withstand practical use.

Furthermore, in wire coating application, a vinyl chloride resin has a problem that it undergoes accelerated oxidative deterioration on contact with copper wire by the catalytic action of copper ions.

It is known to use a heavy metal deactivator, such as a benzotriazole compound, to avoid the adverse influence by copper ions. For example, Patent Document 1 proposes use of a benzotriazole compound having a nitro group, a halogen group or an alkoxy group to stabilize a vinyl chloride resin against thermal hue change, and Patent Document 2 proposes a non-rigid polyvinyl chloride resin composition containing a dialkyl phthalate, chlorinated paraffin, clay, and a benzotriazole compound. However, when these benzotriazole compounds, when added alone, produce only small effects or should be added in relatively large quantities, which has given rise to a problem, such as reduction in coloring resistance or stickiness of the coating compound to copper wire.

Hence, Patent Document 3 proposes addition of a benzotriazole compound combined with a β-diketone compound to a vinyl chloride resin composition for wire coating. The problem of this technique is that satisfactory results are not obtained in some surrounding environments.

Patent Document 4 proposes adding to a synthetic resin a salicylamide compound as a heavy metal deactivator. However, the salicylamide compound produces only a small effect when used alone and should be added in a relatively large amount, which results in damage to coloring resistance and reduction of insulating properties.

Additionally, Patent Document 5 discloses a polyvinyl chloride resin composition for wire coating for wire harnesses containing a benzotriazole compound and a chelating compound such as an amide compound. Nevertheless, there is no mention of synergistic effect by combining specific compounds.

Patent Document 1: JP-B-47-41735
Patent Document 2: JP-A-56-147839
Patent Document 3: JP-A-10-308122
Patent Document 4: JP-A-47-39141
Patent Document 5: JP-A-8-283501

DISCLOSURE OF THE INVENTION

Problems to be Solved by the Invention

An object of the present invention is to provide a vinyl chloride resin insulating material excellent in coloring resistance, resistance to copper contamination, and electrical insulating properties and suitable as a wire coating compound.

Means for Solving the Problems

As a result of extensive investigations, the present inventors have found that the above object is accomplished by a vinyl chloride resin composition comprising a vinyl chloride resin having incorporated thereto a combination of a benzotriazole compound and a salicylamide compound.

The present invention provides a vinyl chloride resin composition comprising 100 parts by mass of a vinyl chloride resin, (a) 0.001 to 10 parts by mass of at least one benzotriazole compound represented by general formula (I) shown below, and (b) 0.001 to 10 parts by mass of at least one salicylamide compound represented by general formula (II) shown below.

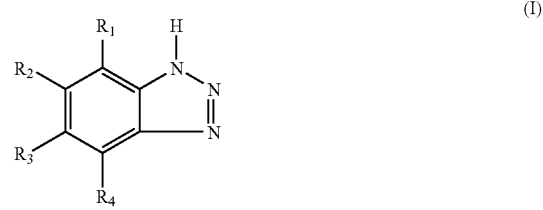

wherein $R_1$, $R_2$, $R_3$, and $R_4$ each independently represent a hydrogen atom, a halogen atom, a hydroxyl group, a nitro group, a carboxyl group, an alkyl group, an alkoxycarbonyl group or an alkanoylamino group.

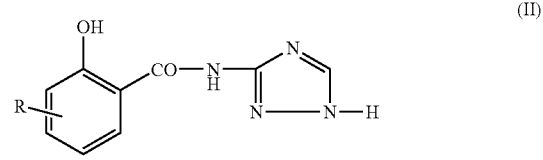

wherein R represents a hydrogen atom, an alkyl group having 1 to 12 carbon atoms or an alkoxy group having 1 to 12 carbon atoms.

The present invention also provides a wire coating compound comprising the vinyl chloride resin composition according to the present invention.

BEST MODE FOR CARRYING OUT THE INVENTION

The vinyl chloride resin composition of the present invention will be described in detail.

In general formula (I) representing the benzotriazole compound as component (a) used in the present invention, the halogen atom represented by $R_1$, $R_2$, $R_3$, and $R_4$ includes fluorine, chlorine, bromine, and iodine. The alkyl group includes lower alkyl groups having 1 to 4 carbon atoms, such as methyl, ethyl, propyl, isopropyl, butyl, isobutyl, sec-butyl, and tert-butyl. The alkoxycarbonyl group includes methoxycarbonyl, ethoxycarbonyl, propoxycarbonyl, and butoxycarbonyl. The alkanoylamino group includes octyloylamino and decanoylamino.

Examples of the benzotriazole compound are 1,2,3-benzotriazole, 4-chloro-1,2,3-benzotriazole, 4-hydroxy-1,2,3-benzotriazole, 4-nitro-1,2,3-benzotriazole, 5-carboxy-1,2,3-benzotriazole, 4-methyl-1,2,3-benzotriazole, 6-methyl-1,2,3-benzotriazole, 6-butyl-1,2,3-benzotriazole, 6-dodecyl-1,2,3-benzotriazole, 5-methoxycarbonyl-1,2,3-benzotriazole, and 6-octyloylamino-1,2,3-benzotriazole. Preferred of them are 1,2,3-benzotriazole and a lower alkyl-substituted-1,2,3-benzotriazole, such as 4-methyl-1,2,3-benzotriazole or 6-methyl-1,2,3-benzotriazole, with 1,2,3-benzotriazole being particularly preferred. These benzotriazole compounds can be used either individually or as a mixture of two or more thereof.

The benzotriazole compound is used in an amount of 0.001 to 10 parts by mass, preferably 0.01 to 5 parts by mass, still preferably 0.01 to 1 part by mass, per 100 parts by mass of the vinyl chloride resin. If the amount is less than 0.001 parts by mass, a sufficient effect of addition is not obtained. If added in amounts exceeding 10 parts by mass, the benzotriazole compound can reduce the insulating properties or bloom.

In general formula (II) representing the salicylamide compound that can be used as component (b), the alkyl group having 1 to 12 carbon atoms as represented by R includes straight-chain or branched alkyl groups such as methyl, ethyl, propyl, isopropyl, butyl, isobutyl, sec-butyl, tert-butyl, pentyl, isopentyl, sec-pentyl, hexyl, heptyl, octyl, isooctyl, sec-octyl, 2-ethylhexyl, nonyl, isononyl, and decyl. The alkoxy group having 1 to 12 carbon atoms as represented by R includes straight-chain or branched one, such as methoxy, ethoxy, propoxy, isopropoxy, butoxy, pentyloxy, hexyloxy, heptyloxy, octyloxy, nonyloxy, and decyloxy.

Examples of the salicylamide compound are N-(1,2,4-triazol-3-yl)salicylamide, N-(1,2,4-triazol-3-yl)-3-methylsalicylamide, N-(1,2,4-triazol-3-yl)-5-methylsalicylamide, N-(1,2,4-triazol-3-yl)-5-tert-octylsalicylamide, and N-(1,2,4-triazol-3-yl)-4-methoxysalicylamide. Particularly preferred of them is N-(1,2,4-triazol-3-yl)salicylamide. These salicylamide compounds can be used either individually or as a mixture of two or more thereof.

The salicylamide compound is used in an amount of 0.001 to 10 part by mass, preferably 0.01 to 5 parts by mass, still preferably 0.01 to 1 part by mass, per 100 parts by mass of the vinyl chloride resin. If the amount is less than 0.001 parts by mass, a sufficient effect of addition is not obtained. If added in amounts exceeding 10 parts by mass, the compound can reduce the insulating properties or bloom.

The ratio of the benzotriazole compound as component (a) to the salicylamide compound as component (b) is arbitrarily selected but preferably ranges from 10/90 to 90/10, still preferably 20/80 to 80/20, by mass. Ratios out of that range can result in a failure to obtain a sufficient synergistic effect.

The vinyl chloride resin that can be used in the present invention is not particularly limited by method of polymerization and may be produced by bulk polymerization, solution polymerization, suspension polymerization, emulsion polymerization, etc. Examples of the vinyl chloride resin include chlorine-containing resins, such as polyvinyl chloride, chlorinated polyvinyl chloride, polyvinylidene chloride, chlorinated polyethylene, vinyl chloride-vinyl acetate copolymers, vinyl chloride-ethylene copolymers, vinyl chloride-propylene copolymers, vinyl chloride-styrene copolymers, vinyl chloride-isobutylene copolymers, vinyl chloride-vinylidene chloride copolymers, vinyl chloride-styrene-maleic anhydride terpolymers, vinyl chloride-styrene-acrylonitrile copolymers, vinyl chloride-butadiene copolymers, vinyl chloride-isoprene copolymers, vinyl chloride-chlorinated propylene copolymers, vinyl chloride-vinylidene chloride-vinyl acetate terpolymers, vinyl chloride-maleic ester copolymers, vinyl chloride-methacrylic ester copolymers, vinyl chloride-acrylonitrile copolymers, and vinyl chloride-vinyl ether copolymers; polyblends of these chlorine-containing polymers; polyblends of the chlorine-containing polymer and chlorine-free synthetic resins, such as acrylonitrile-styrene copolymers, ethylene-vinyl acetate copolymers, ethylene-ethyl(meth)acrylate copolymers, and polyester; block copolymers or graft copolymers of chlorine-containing monomers and chlorine-free monomers of the above-recited resins.

The vinyl chloride resin composition of the present invention can contain a metal stabilizer commonly added to vinyl chloride resins. Useful metal stabilizers include lead-based stabilizers, organic acid metal salts, organotin stabilizers, and mixed metal stabilizers.

Examples of the lead-based stabilizers include white lead, basic lead silicate, basic lead sulfate, dibasic lead sulfate, tribasic lead sulfate, basic lead sulfite, dibasic lead phosphite, silica gel coprecipitated lead silicate, dibasic lead phthalate, tribasic lead maleate, lead salicylate, lead stearate, basic lead stearate, dibasic lead stearate, lead laurate, lead octylate, lead 12-hydroxystearate, lead behenate, and lead naphthenate.

Examples of the organic acid metal salts include those between carboxylic acids, organophosphoric acids or phenols and metals (e.g., Li, Na, K, Ca, Ba, Mg, Sr, Zn, Cd, Sn, Cs, and Al). The carboxylic acids include caproic acid, caprylic acid, pelargonic acid, 2-ethylhexylic acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenylstearic acid, ricinoleic acid, linoleic acid, linolenic acid, oleic acid, arachic acid, behenic acid, erucic acid, brassidic acid, and like acids; naturally occurring mixtures of these acids, such as animal fatty acids, palm oil fatty acid, tung oil fatty acid, soybean oil fatty acid, and cotton seed oil fatty acid; benzoic acid, p-t-butylbenzoic acid, ethylbenzoic acid, isopropylbenzoic acid, toluoylic acid, xylylic acid, salicylic acid, 5-t-octylsalicylic acid, naphthenic acid, and cyclohexanecarboxylic acid. Examples of the organophosphoric acids include mono- or dioctylphosphoric acid, mono- or didodecylphosphoric acid, mono- or dioctadecylphosphoric acid, mono- or di(nonylphenyl)phosphoric acid, nonylphenyl phosphonate, and stearyl phosphonate. Examples of the phenols are phenol, cresol, ethylphenol, cyclohexylphenol, nonylphenol, and dodecylphenol. The organic acid metal salts may be any of normal salts, acidic salts, basic salts, and over-based complexes.

Examples of the organotin stabilizers include methylstannoic acid, butyistannoic acid, octylstannoic acid, dimethyltin oxide, dibutyltin oxide, dioctyltin oxide, dimethyltin sulfide, dibutyltin sulfide, dioctyltin sulfide, monobutyltin oxide sulfide, methylthiostannoic acid, butylthiostannoic acid, octylthiostannoic acid, dibutyltin dilaurate, dibutyltin distearate, dioctyltin dioleate, dibutyltin basic laurate, dibutyltin dicrotonate, dibutyltin bis(butoxydiethylefle glycol maleate), dibutyltin methyl octyl neopentyl glycol maleate, dibutyltin isooctyl. 1,4-butanediol maleate, dibutyltin dimethacrylate, dibutyltin dicinnamate, dioctyltin bis(oleyl maleate), dibutyltin bis(stearyl maleate), dibutyltin itaconate, dioctyltin maleate, dimethyltin dicrotonate, dioctyltin bis(butyl maleate), dibutyltin dimethoxide, dibutyltin dilauroxide, dioctyltin ethylene glycoxide, pentaerythritol. dibutyltin oxide condensate, dibutyltin bis(lauryl mercaptide), dimethyltin bis (stearyl mercaptide), monobutyltin tris (lauryl mercaptide), dibutyltin β-mercaptopropionate, dioctyltin β-mercaptopropionate, dibutyltin mercaptoacetate, monobutyltin tris (isooctyl mercaptoacetate), monooctyltin tris (2-ethylhexyl mercaptoacetate), dibutyltin bis (isooctyl mercaptoacetate), dioctyltin bis(isooctyl mercaptoacetate), dioctyltin bis(2-ethylhexyl mercaptoacetate), dimethyltin bis (isooctyl mercaptoacetate), dimethyltin bis (isooctyl mercaptopropionate), monobutyltin tris (isooctyl mercaptopropionate), bis [monobutyldi (isooctoxycarbonylmethylenethio) tin] sulfide, bis [dibutylmono(isooctoxycarbonylmethylenethio)tin] sulfide, monobutylmonochlorotin bis (isooctyl mercaptopropionate), monobutylmonochlorotin bis (isooctyl mercaptoacetate), monobutylmonochiorotin bis (lauryl mercaptide), butyltin bis(ethylcellosolve maleate), bis(dioctyltin butyl maleate) maleate, bis(methyltin diisooctyl thioglycolate) disulfide, bis (methyl/dimethyltin mono/diisooctyl thioglycolate) disulfide, bis(methyltin diisooctyl thioglycolate) trisulfide, bis(butyltin diisooctyl thioglycolate) trisulfide, and 2-butoxycarbonylethyltin tris(butyl thioglycolate).

The amount of the metal stabilizers to be added is preferably 0.05 to 10 parts by mass per 100 parts by mass of the vinyl chloride resin.

The vinyl chloride resin composition of the present invention can contain a plasticizer.

Any kind of plasticizers commonly added to vinyl chloride resins can be used, including phthalate plasticizers, such as dibutyl phthalate, butylhexyl phthalate, diheptyl phthalate, dioctyl phthalate, diisononyl phthalate, diisodecyl phthalate, dilauryl phthalate, dicyclohexyl phthalate, and dioctyl terephthalate; adipate plasticizers, such as dioctyl adipate, diisononyl adipate, diisodecyl adipate, and di(butyl diglycol) adipate; phosphate plasticizers, such as triphenyl phosphate, tricresyl phosphate, trixylenyl phosphate, tri(isopropylphenyl)phosphate, triethyl phosphate, tributyl phosphate, trioctyl phosphate, tri(butoxyethyl)phosphate, and octyldiphenyl phosphate; polyester plasticizers obtained by using polyhydric alcohols, e.g., ethylene glycol, diethylene glycol, triethylene glycol, 1,2-propylene glycol, 1,3-propylene glycol, 1,3-butanediol, 1,4-butanediol, 1,5-hexanediol, 1,6-hexanediol, and neopentyl glycol, and dibasic acids, e.g., oxalic acid, malonic acid, succinic acid, glutaric acid, adipic acid, pimelic acid, suberic acid, azelaic acid, sebacic acid, phthalic acid, isophthalic acid, and terephthalic acid, and, if desired, a monohydric alcohol or a monocarboxylic acid as a stopper; tetrahydrophthalic acid plasticizers, azelaic acid plasticizers, sebacic acid plasticizers, stearic acid plasticizers, citric acid plasticizers, trimellitic acid plasticizers, pyromellitic acid plasticizers, and biphenylenepolycarboxylic acid plasticizers.

The plasticizer can be used in an arbitrarily selected amount and is preferably added in an amount of 10 to 100 parts by mass, still preferably 20 to 80 parts by mass, per 100 parts by mass of the vinyl chloride resin.

The vinyl chloride resin composition of the invention may further contain various additives generally used in vinyl chloride resins, such as organic phosphite compounds, phenol type or sulfur type antioxidants, hydrotalcite compounds, epoxy compounds, polyol compounds, β-diketone compounds, ultraviolet absorbers, hindered amine light stabilizers, inorganic stabilizers, long-chain fatty acids, lubricants, fillers, and pigments.

Examples of the organic phosphite compounds include triphenyl phosphite, tris(2,4-di-t-butylphenyl)phosphite, tris(nonylphenyl)phosphite, tris(dinonylphenyl)phosphite, tris(mono/di-mixed nonylphenyl)phosphite, diphenyl acid phosphite, 2,2'-methylenebis(4,6-di-t-butylphenyl)octyl phosphite, diphenyldecyl phosphite, phenyldiisodecyl phosphite, tributyl phosphite, tri(2-ethylhexyl)phosphite, tridecyl phosphite, trilauryl phosphite, dibutyl acid phosphite, dilauryl acid phosphite, trilauryl trithiophosphite, bis(neopentyl glycol).1,4-cyclohexanedimethyl diphosphite, bis(2,4-di-tert-butylphenyl)pentaerythritol diphosphite, bis(2,6-di-tert-butyl-4-methylphenyl)pentaerythritol diphosphite, distearyl pentaerythritol diphosphite, phenyl-4,4'-isopropylidenediphenol.pentaerythritol diphosphite, tetra($C_{12-15}$ mixed alkyl)-4,4'-isopropylidenediphenyl diphosphite, hydrogenated 4,4'-isopropylidenediphenol polyphosphite, bis(octylphenyl).bis[4,4'-n-butylidenebis(2-tert-butyl-5-methylphenol)].1,6-hexanediol.diphosphite, tetramidecyl.4,4'-butylidenebis(2-tert-butyl-5-methylphenol) diphosphite, hexa(tridecyl).1,1,3-tris(2-methyl-5-tert-butyl-4-hydroxyphenyl)butane.triphosphite, 9,10-dihydro-9-oxa-10-phosphaphenanthrene -10-oxide, and 2-butyl-2-ethylpropanediol.2,4,6-tri-tert-butylphenol monophosphite.

Examples of the phenol type antioxidants include 2,6-di-tert-butyl-p-cresol, 2,6-diphenyl-4-octadecyloxyphenol, stearyl (3,5-di-tert-butyl-4-hydroxyphenyl)propionate, distearyl (3,5-di-tert-butyl-4-hydroxybenzyl)phosphonate, thiodiethylenebis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butyric acid]glycol ester, 4,4'-butylidenebis(6-tert-butyl-m-cresol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl) isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3,5-di-tert-butyl-4-hydroxyphenyl) propionate]methane, 2-tert-butyl-4-methyl-6-(2-acryloyloxy-3-tert-butyl-5-methylbenzyl)phenol, 3,9-bis[1,1-dimethyl -2-hydroxyethyl]-2,4,8,10-tetraoxaspiro[5,5] undecane-bis[,1-(3-tert-butyl-4-hydroxy-5-butylphenyl) propionate], and triethylene glycol bis[β-(3-tert-butyl-4-hydroxy-5-methylphenyl)propionate].

Examples of the sulfur type antioxidants include dialkyl thiodipropionates, such as a dilauryl, dimyristyl, myristyl-stearyl or distearyl ester of thiodipropionic acid; and polyol β-alkylmercaptopropionic acid esters, such as pentaerythritol tetra(β-dodecylmercaptopropionate).

The hydrotalcite compounds preferably include complex salt compounds composed of magnesium and aluminum or composed of zinc, magnesium, and aluminum which are represented by general formula (III) shown below. The compounds may be freed of water of crystallization.

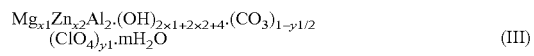

$$Mg_{x1}Zn_{x2}Al_2.(OH)_{2\times1+2\times2+4}.(CO_3)_{1-y.1/2}(ClO_4)_{y.1}.mH_2O \quad (III)$$

wherein x1, x2, and y1 each represent a number satisfying the following conditions; m represents 0 or any integer; $0 \leq x2/x1 < 10$, $2 \leq x1+x2 < 20$, and $0 \leq y1 \leq 2$.

The hydrotalcite compound may be a naturally occurring substance or a synthetic product. Methods of synthesizing the hydrotalcite compounds include those known from literature, such as JP-B-46-2280, JP-B-50-30039, JP-B-51-29129, JP-B-3-36839, and JP-A-61-174270. In the present invention, the above-recited hydrotalcite compounds can be used without any restriction of crystal structure, crystal grain size, and the like.

The hydrotalcite compound may be coated with a higher fatty acid (e.g., stearic acid), a higher fatty acid metal salt (e.g., an alkali metal oleate), an organic sulfonic acid metal salt (e.g., an alkali metal dodecylbenzenesulfonate), a higher fatty acid amide, a higher fatty acid ester, a wax, etc.

Examples of the epoxy compounds include epoxidized animal or plant oils, such as epoxidized soybean oil, epoxidized linseed oil, epoxidized tung oil, epoxidized fish oil, epoxidized beef tallow oil, epoxidized castor oil, and epoxidized safflower oil; epoxidized stearic acid methyl, butyl, 2-ethylhexyl or stearyl ester, epoxidized polybutadiene, tris(epoxypropyl)isocyanurate, epoxidized tall oil fatty acid ester, epoxidized linseed oil fatty acid ester, bisphenol A diglycidyl ether, vinylcyclohexene diepoxide, dicyclohexene diepoxide, and 3,4-epoxycyclohexyl methylepoxycyclohexanecarboxylate. In using an epoxy compound which functions as a plasticizer, such as epoxidized soybean oil, the total amount of such an epoxy compound and the above-described plasticizer should be 25 parts by mass or less so as not to reduce the rigidity.

Examples of the polyol compounds include trimethylolpropane, ditrimethylolpropane, pentaerythritol, dipentaerythritol, polypentaerythritol, mono- or dipentaerythritol stearic acid half ester, bis(dipentaerythritol) adipate, glycerol, and tris(2-hydroxyethyl)isocyanurate.

Examples of the β-diketone compounds include acetylacetone, triacetylmethane, 2,4,6-heptatrione, butanoylacetylmethane, lauroylacetylmethane, palmitoylacetylmethane, stearoylacetylmethane, phenylacetylacetylmethane, dicyclohexylcarbonylmethane, benzoylformylmethane, benzoylacetylmethane, dibenzoylmethane, octylbenzoylmethane, bis(4-octylbenzoyl)methane, benzoyldiacetylmethane, 4-methoxybenzoylbenzoylmethane, bis(4-carboxymethylbenzoyl)methane, 2-carboxymethylbenzoylacetyloctylmethane, dehydroacetic acid, cyclohexane-1,3-dione, methyl 3,6-dimethyl-2,4-dioxycyclohexane-1-carboxylate, 2-acetylcyclohexanone, dimedone, and 2-benzoylcyclohexane. Metal salts of these β-diketone compounds are useful as well. Metal species providing the β-diketone metal salts include alkali metals, such as lithium, sodium, and potassium; alkaline earth metals, such as magnesium, calcium, strontium, and barium; zinc, aluminum, tin, and alkyltins.

Examples of the ultraviolet absorbers include 2-hydroxybenzophenones, such as 2,4-dihydroxybenzophenone, 2-hydroxy-4-methoxybenzophenone, 2-hydroxy-4-octyloxybenzophenone, and 5,5'-methylenebis(2-hydroxy-4-methoxybenzophenone); 2-(2-hydroxyphenyl) benzotriazoles, such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolyl)phenol, and polyethylene glycol ester of 2-(2-hydroxy-3-tert -butyl-5-carboxyphenyl)benzotriazole; benzoates, such as phenyl salicylate, resorcinol monobenzoate, 2,4-di-tert-butylphenyl-3,5-di-tert-butyl-4-hydroxybenzoate, and hexadecyl 3,5-di-tert-butyl-4-hydroxybenzoate; substituted oxanilides, such as 2-ethyl-2'-ethoxyoxanilide and 2-ethoxy-4'-dodecyloxanilide; and cyanoacrylates, such as ethyl α-cyano-β,β-diphenylacrylate and methyl-2-cyano-3-methyl-3-(p -methoxyphenyl)acrylate.

Examples of the hindered amine light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis (1,2,2,6,6-pentamethyl-4-piperidyl)sebacate, tetrakis(2,2,6, 6-tetramethyl-4-piperidyl)butanetetracarboxylate, tetrakis(1, 2,2,6,6-pentamethyl-4-piperidyl)butanetetracarboxylate, bis (1,2,2,6,6-pentamethyl-4-piperidyl)di(tridecyl)-1,2,3,4-butanetetracarboxylate, bis(1,2,2,6,6-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinovdiethyl succinate polycondensate, 1,6-bis(2,2,6, 6-tetraethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino) hexane/2,4-dichloro-6-tert -octylamino-s-triazine polycondensate, 1,5,8,12-tetrakis[2,4-bis(N-butyl-N-(2,2,6, 6-tetramethyl-4-piperidyl)amino)-s-triazin-6-yl]-1,5,8,12-tetraazadodecane, 1,5,8,12-tetrakis[2,4-bis(N-butyl-N-(1,2, 2,6,6-pentamethyl-4-piperidyl)amino)-s-triazin-6-yl]-1,5,8, 12-tetraazadodecane, 1,6,11-tris[2,4-bis(N-butyl-N-(2,2,6, 6-tetramethyl-4-piperidyl)amino)-s-triazin-6-ylamino] undecane, and 1,6,11-tris[2,4-bis(N -butyl-N-(1,2,2,6,6-pentamethyl-4-piperidyl)amino)-s-triazin-6-ylamino] undecane.

Examples of the inorganic stabilizers include magnesium silicate, calcium silicate, barium silicate, silicic anhydride, zeolite, magnesium oxide, magnesium hydroxide, calcium oxide, calcium hydroxide, amorphous aluminosilicate, sodium perchlorate, magnesium perchlorate, and barium perchlorate.

Examples of the long-chain fatty acids include capric acid, neodecanoic acid, undecylenic acid, lauric acid, myristic acid, palmitic acid, stearic acid, isostearic acid, 12-hydroxystearic acid, chlorostearic acid, 12-ketostearic acid, ricinoleic acid, linoleic acid, linolenic acid, oleic acid, arachic acid, behenic acid, erucic acid, and brassidic acid.

Examples of the lubricants include hydrocarbons, such as natural paraffin and low molecular polyethylene; fatty acids, such as stearic acid, lauric acid, and erucic acid; aliphatic alcohols, such as cetyl alcohol and stearyl alcohol; fatty acid amides, such as stearamide and ethylenebisstearamide; fatty acid lower alcohol esters, such as butyl stearate; and higher fatty acid higher alcohol esters, such as glycerol monostearate.

Examples of the fillers include calcium carbonate, silica, clay, glass beads, mica, sericite, glass flakes, asbestos, wollastonite, potassium titanate, PMF, gypsum fiber, xonotlite, MOS, phosphate fiber, glass fiber, carbon fiber, and aramid fiber.

Examples of the pigments include red oxide, lead chromate, ultramarine, carbon black, azo pigments, phthalocyanine pigments, quinacridone pigments, and dioxazine pigments.

Fillers that can be used in the vinyl chloride resin composition of the invention for wire coating application include calcium carbonate, calcium oxide, calcium hydroxide, zinc oxide, zinc hydroxide, zinc carbonate, zinc sulfate, magnesium oxide, magnesium hydroxide, magnesium carbonate, aluminum oxide, aluminum hydroxide, sodium aluminosilicate, hydrotalcite, hydrocalumite, metal silicates, such as aluminum silicate, magnesium silicate, calcium silicate, and zeolite, activated clay, talc, clay, red oxide, asbestos, and antimony trioxide.

The vinyl chloride resin composition of the invention may contain a stabilization assistant commonly used for vinyl chloride resins, such as diphenylthiourea, anilinodithiotriazine, melamine, benzoic acid, cinnamic acid, p-tert-butyl -benzoic acid.

If desired, the vinyl chloride resin composition of the invention may further contain various additives commonly employed for vinyl chloride resins. Such additives include crosslinking agents, antistatic agents, antifogging agents, anti-plate-out agents, surface treating agents, flame retardants, anti-fogging agents, fluorescent agents, antifungals, bactericides, blowing agents, metal deactivators, parting agents, processing aids, antioxidants, and light stabilizers.

The amounts of the additives other than components (a) and (b) to be added are selected appropriately according to the kinds. Preferably, they are used in a total amount of up to 200 parts by mass per 100 parts by mass of the vinyl chloride resin.

The vinyl chloride resin composition of the invention is used in any processing without restriction. For example, the composition is suitably processed by calendering, rolling, extrusion molding, melt casting, pressure forming, and powder forming.

Applications of the vinyl chloride resin composition of the present invention include constructive materials such as wall materials, floor materials, window frames, and wall papers; wire coating materials; automotive exterior materials; agricultural materials such as greenhouses and tunnels; food (e.g., fish) packaging materials such as wrap films and trays; coatings; and miscellaneous goods such as hoses, pipes, sheets, toys, and gloves. In particular, the vinyl chloride resin composition of the invention is useful as agricultural materials such as greenhouses and tunnels. It is suitable for use as a wire coating material because of its excellent resistance to copper contamination.

EXAMPLES

The vinyl chloride resin composition of the present invention will now be illustrated in greater detail with reference to Examples, but it should be understood that the invention is not deemed to be limited thereto.

Example 1 and Comparative Example 1

A mixture having the following formulation was roll kneaded at 160° C. and 20 rpm for 6 minutes and pressed at 180° C. for 5 minutes to prepare a 1 mm thick sheet, which was measured for yellowness. Another sheet prepared under the same conditions but by pressing for 30 minutes was measured for yellowness. A test piece was prepared from that sheet and heated in a Geer oven at 200° C., and the time (min) required for blackening was measured to evaluate heat stability.

The 1 mm thick sheet was measured for VR value (Ωm) under conditions of an applied voltage of 500 V, a temperature of 30° C., and a relative humidity of 42%.

Copper foil was sandwiched between a pair of the rolled sheets and pressed at 180° C. for 5 minutes to prepare a 1 mm thick laminate film. The laminate film was placed in a Geer oven at 105° C., a thermohygrostat at 60° C. and 80% RH, or a water bath at 40° C. After one week, the color of the polyvinyl chloride layers of the laminate film was observed with the naked eye to evaluate resistance to copper contamination. The resistance to copper contamination was rated on a one to ten scale. One means almost no coloring. The larger the scale, the more the coloring.

The results obtained are shown in Tables 1 and 2 below.

| Formulation (part by mass) | |
| --- | --- |
| Polyvinyl chloride resin (degree of polymerization: 1050) | 100 |
| Di(2-ethylhexyl) phthalate | 50 |
| Calcium carbonate | 40 |
| Zinc stearate | 1.0 |
| Hydrotalcite ($Mg_4Al_2(OH)_{12}CO_3 \cdot 3H_2O$) | 2.5 |
| Dibenzoylmethane | 0.2 |
| Silicic anhydride | 0.1 |
| Sorbitol | 0.01 |
| Tetrakis[methylene-3-(3,5-di-tert-butyl-4-hydroxyphenyl)propionate]methane | 0.05 |

Test compound (see Tables 1 and 2 below for the kind and the amount)

TABLE 1

| | | Example | | | | | | |
| --- | --- | --- | --- | --- | --- | --- | --- | --- |
| | | 1-1 | 1-2 | 1-3 | 1-4 | 1-5 | 1-6 | 1-7 |
| Formulation: | | | | | | | | |
| BT-1 | | 0.1 | 0.1 | 0.05 | 0.05 | 0.13 | 0.02 | |
| BT-2 | | | | | | | | 0.1 |
| SA-1 | | 0.1 | 0.05 | 0.1 | 0.05 | 0.02 | 0.13 | 0.1 |
| Test Results: | | | | | | | | |
| Blackening Time | | 120 | 120 | 120 | 120 | 120 | 120 | 120 |
| Yellowness | 5 min | 17.9 | 17.2 | 18.1 | 16.8 | 17.2 | 19.4 | 18.7 |
| | 30 min | 26.8 | 25.8 | 31.7 | 26.7 | 28.5 | 34.7 | 28.6 |
| VR × $10^{12}$ | | 1.5 | 2.2 | 1.3 | 2.9 | 2.4 | 1.0 | 1.2 |
| Resistance to Copper Contamination | 105° C. | 1 | 1 | 2 | 2 | 4 | 4 | 4 |
| | 60° C., 80% | 1 | 1 | 1 | 1 | 1 | 1 | 2 |
| | 40° C., immersion | 1 | 1 | 1 | 1 | 1 | 1 | 1 |

BT-1: 1,2,3-Benzotriazole
BT-2: 5-Methyl-1,2,3-benzotriazole
SA-1: N-(1,2,4-triazol-3-yl)salicylamide

TABLE 2

| | | Comparative Example | | | | |
| --- | --- | --- | --- | --- | --- | --- |
| | | 1-1 | 1-2 | 1-3 | 1-4 | 1-5 |
| Formulation: | | | | | | |
| BT-1 | | | 0.1 | 0.3 | | |
| BT-2 | | | | | | |
| SA-1 | | | | | 0.1 | 0.3 |
| Test Results: | | | | | | |
| Blackening Time | | 95 | 120 | 130 | 95 | 95 |
| Yellowness | 5 min | 16.7 | 17.1 | 20.1 | 18.2 | 25.6 |
| | 30 min | 25.3 | 26.7 | 31.9 | 29.1 | 43.2 |
| VR × $10^{12}$ | | 2.4 | 4.6 | 4.9 | 1.2 | 0.7 |
| Resistance to Copper Contamination | 105° C. | 8 | 8 | 6 | 8 | 7 |
| | 60° C., 80% | 4 | 2 | 1 | 3 | 2 |
| | 40° C., immersion | 10 | 2 | 1 | 3 | 1 |

Example 2

The same test was conducted on the following formulation. The test results are shown in Table 3 below.

| Formulation (part by mass) | |
|---|---|
| Polyvinyl chloride resin (degree of polymerization: 1050) | 100 |
| Di(2-ethylhexyl) phthalate | 60 |
| Epoxidized soybean oil | 1 |
| Stearic acid | 0.2 |
| Zinc stearate | 0.3 |
| Calcium stearate | 0.1 |
| Hydrotalcite ($Mg_{4.5}Al_2(OH)_{13}CO_3 \cdot 3H_2O$) | 0.5 |
| Dibenzoylmethane | 0.2 |
| Silicic anhydride | 0.02 |
| Tetrakis[methylene-3-(3,5-di-tert-butyl-4-hydroxyphenyl)propionate]methane | 0.1 |

Test compound (see Table 3 below for the kind and the amount)

| Formulation (part by mass) | |
|---|---|
| Polyvinyl chloride resin (degree of polymerization: 1300) | 100 |
| Di(2-ethylhexyl) phthalate | 50 |
| Epoxidized soybean oil | 1 |
| Heavy calcium carbonate | 20 |
| Light precipitated calcium carbonate | 20 |
| Titanium dioxide (rutile) | 2 |
| Stearic acid | 0.07 |
| Zinc stearate | 1.0 |
| Calcium stearate | 0.1 |
| Hydrotalcite ($Mg_4Al_2(OH)_{12}CO_3 \cdot 3H_2O$) | 0.5 |
| Dibenzoylmethane | 0.05 |
| Silicic anhydride | 0.03 |
| Tris(2-hydroxyethyl) isocyanurate | 0.02 |
| Tetrakis[methylene-3-(3,5-di-tert-butyl-4-hydroxyphenyl)propionate]methane | 0.1 |

Test compound (see Table 4 below for the kind and the amount)

TABLE 3

| | | Example | | | | Comp. Example | | |
|---|---|---|---|---|---|---|---|---|
| | | 2-1 | 2-2 | 2-3 | 2-4 | 2-1 | 2-2 | 2-3 |
| | | Formulation: | | | | | | |
| BT-1 | | 0.1 | 0.1 | 0.05 | 0.05 | | 0.1 | |
| SA-1 | | 0.1 | 0.05 | 0.1 | 0.05 | | | 0.1 |
| | | Test Results: | | | | | | |
| Blackening Time | | 60 | 60 | 60 | 60 | 45 | 60 | 45 |
| Yellowness | 5 min | 15.4 | 15.1 | 16.2 | 14.9 | 14.5 | 15.0 | 15.6 |
| | 30 min | 34.7 | 33.1 | 36.8 | 32.6 | 31.8 | 31.1 | 35.2 |
| VR × $10^{12}$ | | 3.8 | 4.2 | 2.6 | 2.1 | 2.0 | 6.5 | 1.5 |
| Resistance to Copper Contamination | 105° C. | 1 | 1 | 2 | 2 | 8 | 8 | 8 |
| | 60° C., 80% | 1 | 1 | 1 | 1 | 5 | 2 | 3 |
| | 40° C., immersion | 1 | 1 | 1 | 2 | 10 | 2 | 2 |

Example 3

The same test was conducted on the following formulation. The test results are shown in Table 4 below.

TABLE 4

| | | Example | | | | Comp. Example | | |
|---|---|---|---|---|---|---|---|---|
| | | 3-1 | 3-2 | 3-3 | 3-4 | 3-1 | 3-2 | 3-3 |
| | | Formulation: | | | | | | |
| BT-1 | | 0.1 | 0.1 | 0.05 | 0.05 | | 0.1 | |
| SA-1 | | 0.1 | 0.05 | 0.1 | 0.05 | | | 0.1 |
| | | Test Results: | | | | | | |
| Blackening Time | | 60 | 60 | 60 | 45 | 45 | 60 | 45 |
| Yellowness | 5 min | 12.9 | 11.6 | 12.4 | 11.3 | 10.7 | 11.4 | 12.6 |
| | 30 min | 23.6 | 22.7 | 24.5 | 22.0 | 20.2 | 21.8 | 24.3 |
| VR × $10^{12}$ | | 2.8 | 3.1 | 1.9 | 2.3 | 1.7 | 3.7 | 1.4 |
| Resistance to Copper Contamination | 105° C. | 1 | 1 | 2 | 2 | 7 | 6 | 7 |
| | 60° C., 80% | 1 | 1 | 1 | 2 | 6 | 2 | 2 |
| | 40° C., immersion | 1 | 1 | 2 | 2 | 10 | 2 | 2 |

As is apparent from the results in Tables 1 through 4, addition of a benzotriazole compound alone to a vinyl chloride resin produces an improving effect on resistance to copper contamination in the immersion test or the wet heat test but is little effective in the dry heat test. When the benzotriazole compound is added in an increased amount, the effects increase to some extent, but the improving effect on resistance to copper contamination under the dry heat conditions is still small. On the contrary, disadvantages such as coloring result (Comparative Examples 1-2, 1-3, 2-2, and 3-2). Use of a salicylamide compound alone shows the same tendencies (Comparative Examples 1-4, 1-5, 2-3, and 3-3).

To the contrary, a combined addition of a benzotriazole compound and a salicylamide compound to a vinyl chloride resin exhibits synergism, resulting in remarkable improvement on resistance to copper contamination without adversely affecting heat stability, resistance to thermal coloring, and insulating properties (Examples 1-1 to 1-7 and 2-1 to 2-4, 3-1 to 3-4).

INDUSTRIAL APPLICABILITY

The vinyl chloride resin composition according to the present invention is excellent in coloring resistance, resistance to copper contamination, and the like and is suited for use as a wire coating compound.

The invention claimed is:

1. A vinyl chloride resin composition comprising:
100 parts by mass of a vinyl chloride resin;
0.001 to 10 parts by mass of at least one benzotriazole compound represented by general formula (I)

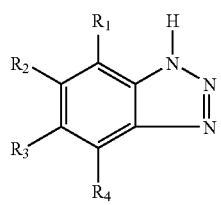

(I)

wherein $R_1$, $R_2$, $R_3$, and $R_4$ each independently represent a hydrogen atom, a halogen atom, a hydroxyl group, a nitro group, a carboxyl group, an alkyl group, an alkoxycarbonyl group or an alkanoylamino group; and
0.001 to 10 parts by mass of at least one salicylamide compound represented by general formula (II):

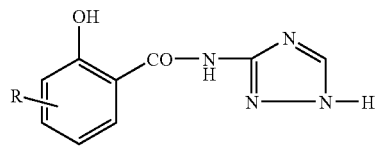

(II)

wherein R represents a hydrogen atom, an alkyl group having 1 to 12 carbon atoms or an alkoxy group having 1 to 12 carbon atoms.

2. The vinyl chloride resin composition according to claim 1, wherein the ratio of the at least one benzotriazole compound to the at least one salicylamide compound is 20/80 to 80/20 by mass.

3. The vinyl chloride resin composition according to claim 1, wherein the at least one benzotriazole compound is 1,2,3-benzotriazole.

4. The vinyl chloride resin composition according to claim 1, wherein the at least one salicylamide compound is N-(1,2,4-triazol-3-yl)salicylamide.

5. The vinyl chloride resin composition according to claim 1, which is for wire coating.

6. The vinyl chloride resin composition according to claim 2, wherein the at least one benzotriazole compound is 1,2,3-benzotriazole.

7. The vinyl chloride resin composition according to claim 2, wherein the at least one salicylamide compound is N-(1,2,4-triazol-3-yl)salicylamide.

8. The vinyl chloride resin composition according to claim 3, wherein the at least one salicylamide compound is N-(1,2,4-triazol-3-yl)salicylamide.

9. The vinyl chloride resin composition according to claim 2, which is for wire coating.

10. The vinyl chloride resin composition according to claim 3, which is for wire coating.

11. The vinyl chloride resin composition according to claim 4, which is for wire coating.

12. The vinyl chloride resin composition of claim 1, wherein the combination of said at least one benzotriazole compound and said at least one salicylamide compound to the vinyl chloride resin improves resistance to copper contamination without adversely affecting heat stability, resistance to thermal coloring, and insulating properties.

13. A wire coating compound comprising:
100 parts by mass of a vinyl chloride resin;
0.001 to 10 parts by mass of at least one benzotriazole compound represented by general formula (I):

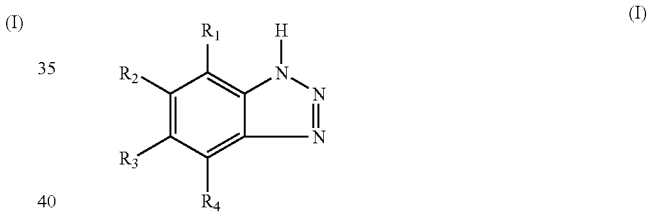

(I)

wherein $R_1$, $R_2$, $R_3$, and $R_4$ each independently represent a hydrogen atom, a halogen atom, a hydroxyl group, a nitro group, a carboxyl group, an alkyl group, an alkoxycarbonyl group or an alkanoylamino group; and
0.001 to 10 parts by mass of at least one salicylamide compound represented by general formula (II):

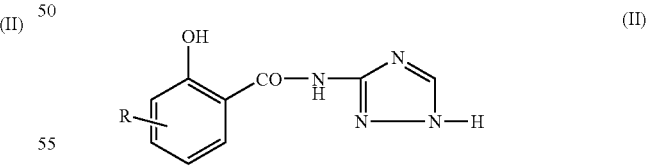

(II)

wherein R represents a hydrogen atom, an alkyl group having 1 to 12 carbon atoms or an alkoxy group having 1 to 12 carbon atoms.

14. The wire coating compound according to claim 13, wherein the ratio of the at least one benzotriazole compound to the at least one salicylamide compound is 20/80 to 80/20 by mass.

15. The wire coating compound according to claim 13, wherein the at least one benzotriazole compound is 1,2,3-benzotriazole.

16. The wire coating compound according to claim 14, wherein the at least one benzotriazole compound is 1,2,3-benzotriazole.

17. The wire coating compound of claim 13, wherein the combination of said at least one benzotriazole compound and said at least one salicylamide compound to the vinyl chloride resin improves resistance to copper contamination without adversely affecting heat stability, resistance to thermal coloring, and insulating properties.

* * * * *